United States Patent
Zhang et al.

(10) Patent No.: US 12,113,919 B2
(45) Date of Patent: Oct. 8, 2024

(54) DECORATION AND ELECTRONIC DEVICE

(71) Applicant: VIVO MOBILE COMMUNICATION CO., LTD., Dongguan (CN)

(72) Inventors: Fuyin Zhang, Dongguan (CN); Bin Jiang, Dongguan (CN); Huazhao Zhou, Dongguan (CN); Kai Huang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 45 days.

(21) Appl. No.: 18/070,454

(22) Filed: Nov. 28, 2022

(65) Prior Publication Data

US 2023/0089610 A1 Mar. 23, 2023

Related U.S. Application Data (63) Continuation of application No. PCT/CN2021/096698, filed on May 28, 2021.

(30) Foreign Application Priority Data

May 29, 2020 (CN) .......................... 202010474670.2

(51) Int. Cl.
*H04M 1/02* (2006.01)
*H04N 23/57* (2023.01)

(52) U.S. Cl.
CPC ................................. *H04M 1/0264* (2013.01)

(58) Field of Classification Search
CPC .............................. H04N 23/57; H04M 1/0264
USPC ........................................................ 348/374
See application file for complete search history.

(56) References Cited

U.S. PATENT DOCUMENTS

| 11,445,098 | B2 * | 9/2022 | Kim ......................... G02B 7/08 |
| 2009/0044920 | A1 * | 2/2009 | De Angelis ............ A47H 19/00 |
| | | | 160/349.2 |
| 2019/0239375 | A1 * | 8/2019 | Lu ...................... G02F 1/133308 |
| 2022/0407990 | A1 * | 12/2022 | Dong .................. H04M 1/0264 |

FOREIGN PATENT DOCUMENTS

| CN | 105346067 | A | | 2/2016 | |
| CN | 105872335 | A | * | 8/2016 | ........... H04N 5/2251 |
| CN | 205656637 | U | | 10/2016 | |
| CN | 106095196 | A | | 11/2016 | |
| CN | 107071240 | A | | 8/2017 | |
| CN | 207115276 | U | | 3/2018 | |
| CN | 207340024 | U | | 5/2018 | |

(Continued)

OTHER PUBLICATIONS

International Search Report issued in corresponding International Application No. PCT/CN2021/096698, mailed Aug. 18, 2021, 6 pages.

(Continued)

*Primary Examiner* — Anthony J Daniels
(74) *Attorney, Agent, or Firm* — IPX PLLC (57) ABSTRACT

A decoration and an electronic device are provided. The decoration includes: a decorative ring and a flexible fixing member, where the flexible fixing member is disposed on an outer surface of the decorative ring, the flexible fixing member extends away from the decorative ring along a radial direction of the decorative ring, and the flexible fixing member is fixedly connected to the decorative ring.

9 Claims, 6 Drawing Sheets

(56) References Cited

FOREIGN PATENT DOCUMENTS

| | | | |
|---|---|---|---|
| CN | 207491070 U | 6/2018 | |
| CN | 108881681 A | * 11/2018 | ........... H04N 5/2252 |
| CN | 108885694 A | 11/2018 | |
| CN | 110730261 A | 1/2020 | |
| CN | 110896419 A | 3/2020 | |
| CN | 210380949 U | 4/2020 | |
| CN | 210578848 U | 5/2020 | |
| CN | 111629092 A | 9/2020 | |
| JP | 2001215592 A | 8/2001 | |
| JP | 2014174551 A | 9/2014 | |
| JP | 2019519906 A | 4/2020 | |

OTHER PUBLICATIONS

First Office Action issued in related Chinese Application No. 202010474670.2, mailed Dec. 21, 2020, 8 pages.
Second Office Action issued in related Chinese Application No. 202010474670.2, mailed Aug. 3, 2021, 6 pages.
Third Office Action issued in related Chinese Application No. 202010474670.2, mailed Jan. 25, 2022, 5 pages.
Extended European Search Report issued in related European Application No. 21811803.2, mailed Oct. 12, 2023, 7 pages.
Notice of Reason of refusal issued in related Japanese Application No. 2022-568992, mailed Dec. 5, 2023, 7 pages.

* cited by examiner

DECORATION AND ELECTRONIC DEVICE

CROSS-REFERENCE TO RELATED APPLICATIONS

This application is a continuation of International Application No. PCT/CN2021/096698, filed on May 28, 2021, which claims priority to Chinese Patent Application No. 202010474670.2, filed on May 29, 2020. The entire contents of each of the above-identified applications are expressly incorporated herein by reference.

TECHNICAL FIELD

This application relates to the technical field of electronic devices, and specifically, to a decoration and an electronic device.

BACKGROUND

Existing electronic devices are generally equipped with a camera module. In order to decorate and protect the camera module, a decoration is usually mounted between a housing and the camera module. In the process of implementing this application, it is found that there are at least the following problems in the related art: The existing decoration includes a decorative ring and a fixing member disposed on an outer surface of the decorative ring. During assembly, the decorative ring is partly disposed inside a through hole in the housing, and the fixing member is fixed on a surface of a target component to fix the entire decoration. Because the fixing member needs to be fixed on the surface of the target component, when the target component has an uneven surface, the decorative ring is much likely to be uneven too. That is, there is a high probability that the decorative ring is uneven, resulting in a poor appearance of the electronic device.

SUMMARY

Embodiments of this application are intended to provide a decoration and an electronic device.

According to a first aspect, an embodiment of this application provides a decoration, including: a decorative ring and a flexible fixing member, where the flexible fixing member is disposed on an outer surface of the decorative ring, the flexible fixing member extends away from the decorative ring along a radial direction of the decorative ring, and the flexible fixing member is fixedly connected to the decorative ring.

According to a second aspect, an embodiment of this application provides an electronic device, including: a decoration according to the first aspect, a housing, and a target bracket, where
the housing is provided with a through hole and an accommodating cavity that are in communication with each other, the decorative ring is partly disposed inside the through hole and partly disposed in the accommodating cavity, the flexible fixing member and the target bracket are both disposed in the accommodating cavity, and the flexible fixing member is located between the housing and the target bracket and is connected to at least one of the housing and the target bracket.

DETAILED DESCRIPTION

The embodiments of this application are described below with reference to the accompanying drawings in the embodiments of this application. Apparently, the embodiments described are some rather than all of the embodiments of this application. All other embodiments derived by persons of ordinary skill in the art based on the embodiments of this application without creative efforts fall within the scope of protection of this application.

The terms such as "first" and "second" in the description and claims of this application are used for distinguishing similar objects, but are not necessarily used for describing a specific sequence or order. It should be understood that the data termed in such a way is interchangeable in proper circumstances so that the embodiments of this application described herein can be implemented in an order other than the order illustrated or described herein. In addition, "first," "second," and the like are generally used to distinguish objects of the same category, rather than to define the number of objects. For example, there may be one object or a plurality of objects. In addition, "and/or" used in the specification and claims means at least one of the connected objects, and the character "/" generally indicates an "or" relationship between the associated objects.

With reference to the accompanying drawings, a decoration and an electronic device provided in the embodiments of this application are described below in detail by using specific embodiments and application scenarios thereof.

As shown in FIG. 1 to FIG. 7, an embodiment of this application provides a decoration, including: a decorative ring 1 and a flexible fixing member 2, where the flexible fixing member 2 is disposed on an outer surface of the decorative ring 1, the flexible fixing member 2 extends away from the decorative ring 1 along a radial direction of the decorative ring 1, and the flexible fixing member 2 is fixedly connected to the decorative ring 1.

In some implementations, the flexible fixing member 2 may be a foldable or bendable fixing member. In some implementations, the flexible fixing member 2 may be made of a flexible material. For example, the flexible fixing member may be an object made of a silicone or plastic material.

In some implementations, there may be one flexible fixing member 2 that may be disposed at one end of an annular outer edge of the decorative ring 1. In some implementations, there may be two flexible fixing members that are both disposed on the annular outer edge of the decorative ring 1 and are symmetrical with respect to the center of the decorative ring.

The flexible fixing member 2 and the decorative ring 1 may be integrally formed or separately formed. When the flexible fixing member and the decorative ring are integrally formed, the flexible fixing member and the decorative ring cannot be separated, which can improve the reliability of the decorative ring. The flexible fixing member and the decorative ring being separately formed can be more convenient to manufacture and process.

In some implementations, the flexible fixing member is provided on the outer surface of the decorative ring, and due to deformability of the flexible fixing member, the shape of the flexible fixing member can be adjusted according to the surface shape of the target component, so that when the decoration is assembled into an electronic device, a probability of unevenness of the decoration can be reduced, and the appearance of the electronic device can be improved. For example, when there are too many local components in the electronic device, the components press the flexible fixing member. The flexible fixing member is deformed according to shapes of the components and pressing forces, so as to adapt to the layout of the internal components of the electronic device, thereby reducing the probability of unevenness of the decoration.

In some implementations, a thickness of the flexible fixing member 2 may be less than a preset thickness. The preset thickness is a skirt thickness of a decoration in common electronic devices. In this way, an assembly space occupied by the decoration can be reduced. In addition, when an assembly position of the flexible fixing member is a bottleneck point in a thickness direction of the electronic device, an overall thickness of the electronic device can also be reduced.

In some implementations, the flexible fixing member 2 is a non-annular flexible fixing member.

In some implementations, the flexible fixing member 2 is a flexible fixing ring, and the flexible fixing ring encircles the decorative ring.

In some implementations, when the flexible fixing member 2 is a non-annular flexible fixing member, the flexible fixing member 2 may be specifically a flexible fixing sheet of various shapes such as a rectangle, a square, a trapezoid, or a circle. In some implementations, the non-annular flexible fixing member is an annular flexible fixing member having a first gap. The first gap is a gap formed between the outer edge of the decorative ring and the outer edge of the flexible fixing ring.

Since the flexible fixing member is a non-annular flexible fixing member, the assembly space occupied by the flexible fixing member can be reduced in a targeted manner. In some embodiments of this application, the decoration has a non-annular flexible fixing member, and the flexible fixing member is disposed at a position in the electronic device having overlapping components that cause a partial protrusion. The decoration can effectively reduce the production cost while reducing the probability of unevenness of the decoration.

In some implementations, the non-annular flexible fixing member may be an elongated member, and there are two flexible fixing members that are symmetrical with respect to the center of the decorative ring. The two flexible fixing members are disposed at a relatively flat position of the electronic device, so that a position of a non-flexible fixing member of the decorative ring faces a position having a protrusion in the electronic device. In this way, the electronic device has the decoration, and the probability of unevenness of the decoration can be effectively reduced.

In some implementations, the flexible fixing member is an annular flexible fixing member that encircles the decorative ring. Due to the principle that the flexible fixing member is deformable, a height of the entire decorative ring can be adjusted while the entire decorative ring is fixed. This can not only further improve the fixing effect, but can also further reduce the probability of unevenness of the decorative ring.

In some implementations, the decoration further includes a first fixing member 3. The first fixing member 3 is disposed on a side of the flexible fixing member 2 away from the decorative ring 1, and the first fixing member 3 is connected to the flexible fixing member 2.

In some implementations, the first fixing member 3 may be specifically a rigid material such as a metal fixing member or a plastic fixing member. In some implementations, the first fixing member may also be a flexible fixing member made of a material different from the material of the flexible fixing member. In some embodiments, the material of the flexible fixing member is a soft rubber material, and the material of the first fixing member is a hard rubber material.

The flexible fixing member 2 and the first fixing member 3 may be integrally formed or separately formed. When the flexible fixing member and the first fixing member are integrally formed, the decoration can have better reliability due to the inseparability. The flexible fixing member and the first fixing member being separately formed can be more convenient to manufacture and process due to the processing separability.

In some embodiments of this application, the first fixing member is a rigid fixing member. Since the rigid fixing member is further provided on the side of the flexible fixing member away from the decorative ring, the rigid fixing member can reinforce the fixation of the decorative ring, so that the fixing effect can be better.

In some implementations, the first fixing member 3 is a rigid fixing ring that encircles the decorative ring 1, a first gap is present between the rigid fixing ring and the decorative ring 1, and the flexible fixing member 2 is disposed in the first gap.

In some implementations, the flexible fixing member is a non-annular flexible fixing member, and the flexible fixing member is disposed in the first gap. The flexible fixing member may be an elongated shape, and there are two flexible fixing members that are symmetrical with respect to the center of the decorative ring. The flexible fixing member is connected to the rigid fixing ring, a protruding component in the electronic device is disposed in the first gap, the protruding component may press against the flexible fixing member, and the protruding component may also be disposed at a position of the first gap that is not the flexible fixing member.

In some implementations, the flexible fixing member is an annular flexible fixing member and encircles the decorative ring. The rigid fixing member is disposed at one end of the flexible fixing member away from the decorative ring. In a case that the electronic device has a protruding component, the protruding component may be disposed at the position of the flexible fixing member. Due to the deformability of the flexible fixing member, the probability of unevenness of the decoration can be reduced.

Figure 1:
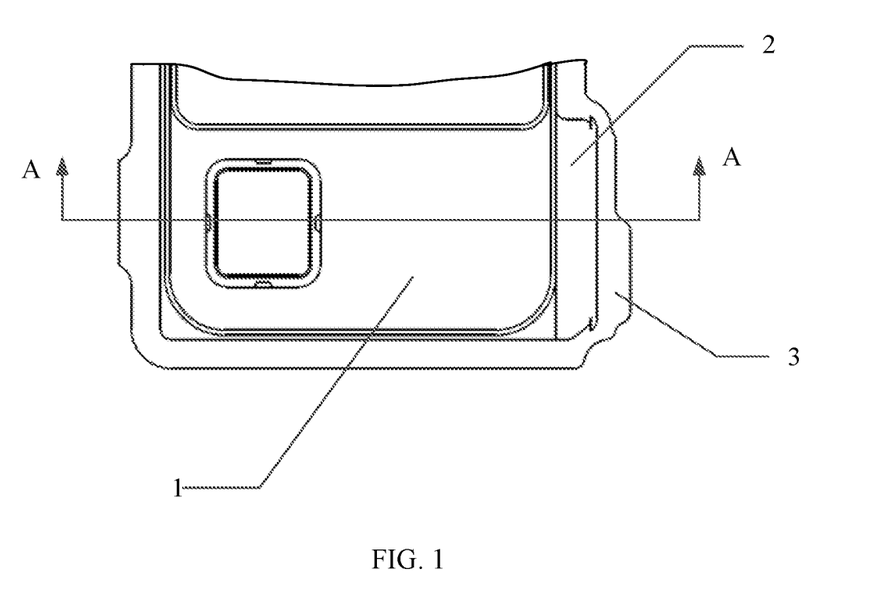
FIG. 1 is a diagram of a partial structure of a decoration according to an embodiment of this application.
Figure 2:
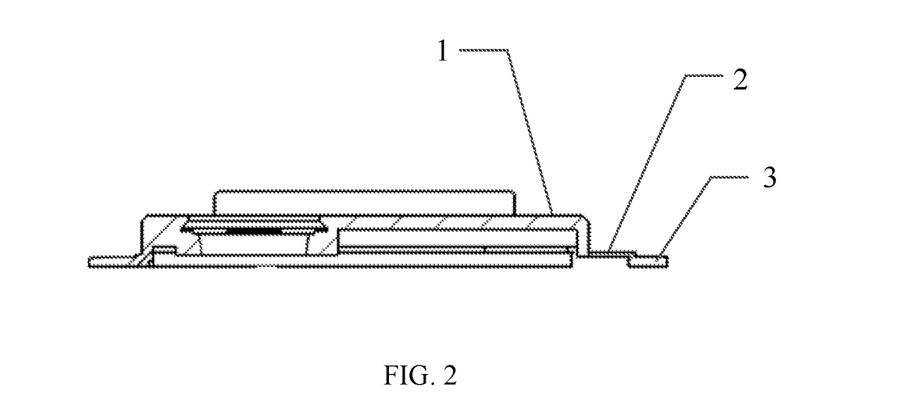
FIG. 2 is an A-A sectional view of the decoration shown in FIG. 1.
Figure 3:
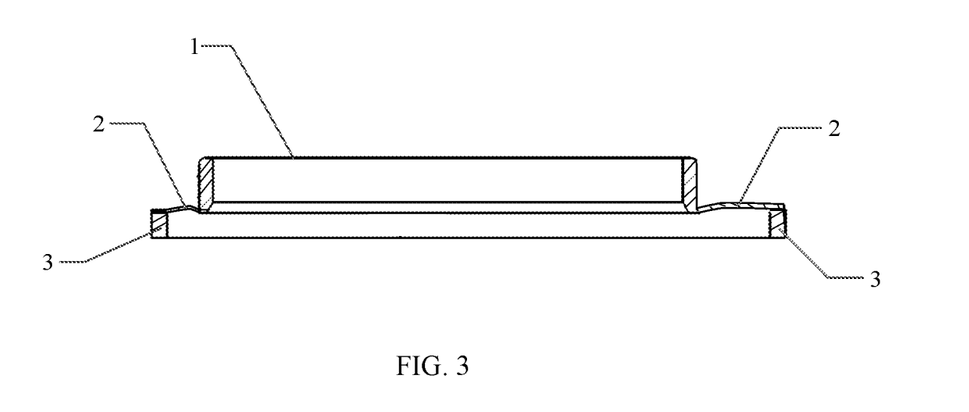
FIG. 3 is a sectional view of another decoration according to an embodiment of this application.
Figure 4:
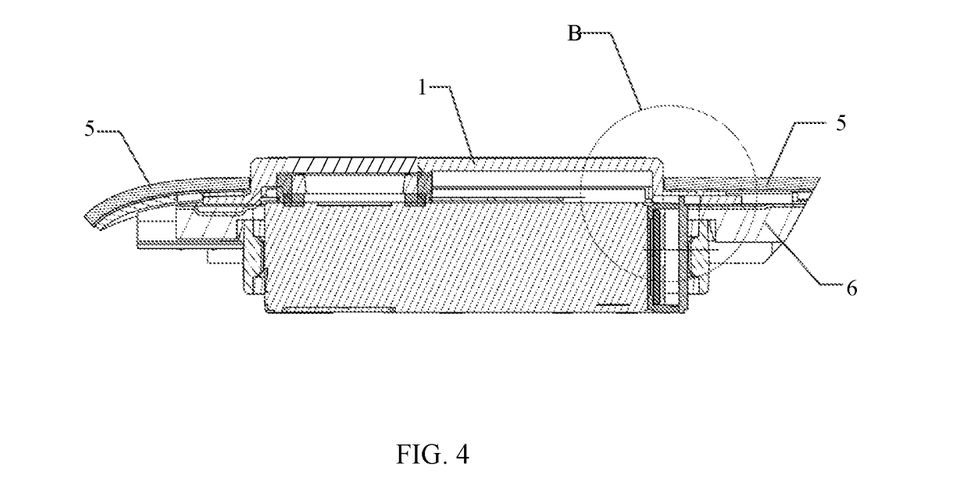
FIG. 4 is a schematic diagram of installation of the decoration shown in FIG. 1.
Figure 5:
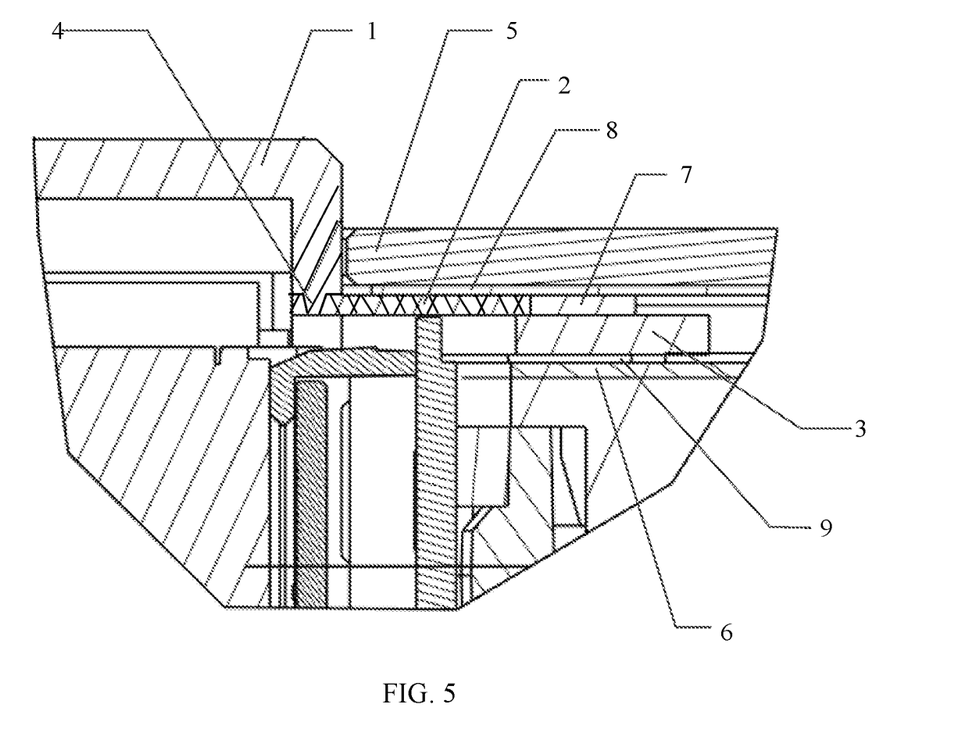
FIG. 5 is an enlarged diagram of B shown in FIG. 4.
Figure 6:
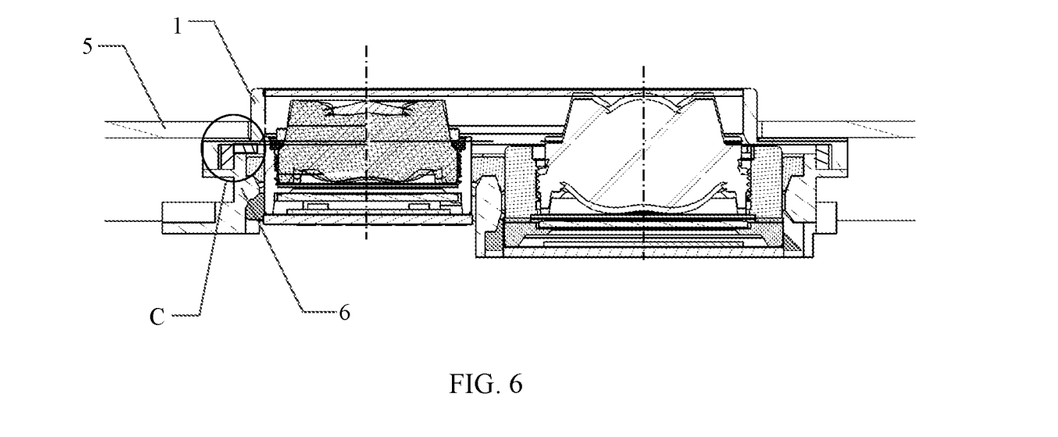
FIG. 6 is a schematic diagram of installation of the decoration shown in FIG. 3.
Figure 7:
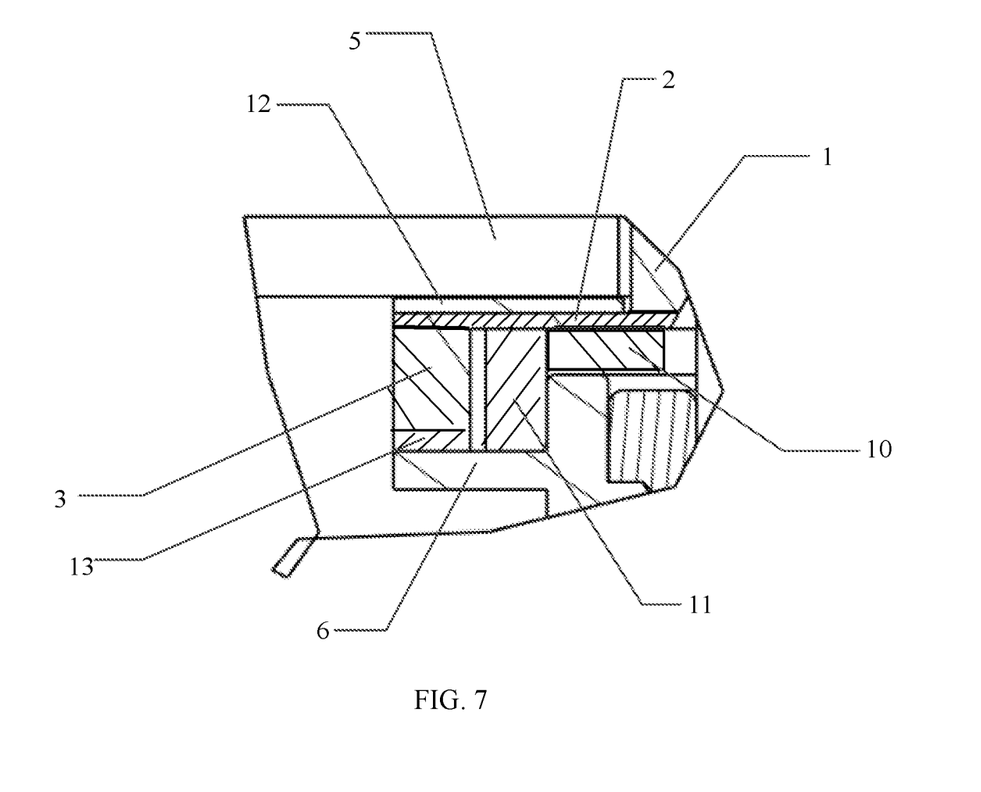
FIG. 7 is an enlarged diagram of C shown in FIG. 6.
Figure 8:
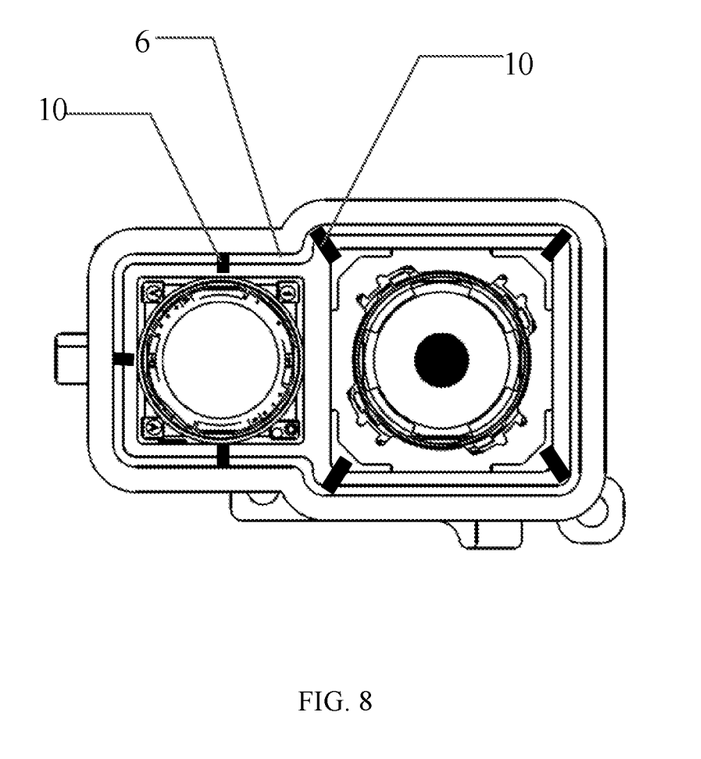
FIG. 8 is a diagram of a partial structure of an electronic device according to an embodiment of this application.

In the embodiments of this application, the rigid fixing ring may be directly connected to the decorative ring 1. In some embodiments, the rigid fixing ring may also be connected to the decorative ring 1 through the flexible fixing ring. For example, as shown in FIG. 3, when the flexible fixing member 2 is a flexible fixing ring that encircles the decorative ring 1, the rigid fixing ring may be connected only to the side of the flexible fixing ring away from the decorative ring 1, so as to be spaced apart from the decorative ring 1.

Since the rigid fixing member is the rigid fixing ring, a fixation area can be increased, making the fixation of the decoration more convenient. In addition, the rigid fixing ring encircles the decorative ring, the first gap is present between the rigid fixing ring and the decorative ring, and the flexible fixing member is disposed in the first gap. This can also provide some protection for the flexible fixing member.

In some implementations, in a case that the flexible fixing member 2 is a non-annular flexible fixing member, the rigid fixing ring is further connected to the outer surface of the decorative ring 1.

In some implementations, in the case that the flexible fixing member 2 is a non-annular flexible fixing member, the rigid fixing ring being further connected to the outer surface of the decorative ring 1 may be specifically: in the case that the flexible fixing member 2 is a non-annular flexible fixing member, the side of the rigid fixing ring close to the decorative ring is further connected to the outer surface of the decorative ring 1, and the flexible fixing member 2 blocks the first gap.

In the case that the flexible fixing member is a non-annular flexible fixing member, the rigid fixing ring is further connected to the outer surface of the decorative ring, so that the rigid fixing ring can directly support and fix the decorative ring. In this way, the fixing effect of the decorative ring can be further improved.

In some implementations, the flexible fixing member 2 and the first fixing member 3 are not coplanar.

In some implementations, the flexible fixing member 2 and the first fixing member 3 being not coplanar may mean that the first fixing member 3 is located below the flexible fixing member 2.

Because the flexible fixing member and the first fixing member are not coplanar, the decoration can be better fixed on a relatively uneven surface.

In some implementations, a limiting structure 4 is provided at a joint between the flexible fixing member 2 and the decorative ring 1.

In the embodiments of this application, the limiting structure 4 may be various limiting structures such as a limiting buckle or a limiting groove.

Because the limiting structure is provided at the joint between the flexible fixing member and the decorative ring, the position of the flexible fixing member can be easily defined, the accuracy of a mounting position of the flexible fixing member is improved, and relative movement between the flexible fixing member and the decorative ring can be limited.

As shown in FIG. 4 to FIG. 8, an embodiment of this application further provides an electronic device, including: a decoration described in the foregoing embodiment, a housing 5, and a target bracket 6.

The housing 5 is provided with a through hole and an accommodating cavity that are in communication with each other, the decorative ring 1 is partly disposed inside the through hole and partly disposed in the accommodating cavity, the flexible fixing member 2 and the target bracket 6 are both disposed in the accommodating cavity, and the flexible fixing member 2 is located between the housing 5 and the target bracket 6 and is connected to at least one of the housing 5 and the target bracket 6.

In some implementations, the decoration described in the foregoing embodiment, the housing, and the target bracket are included;
the housing is provided with the through hole and the accommodating cavity that are in communication with each other, the decorative ring is partly disposed inside the through hole and partly disposed in the accommodating cavity, the flexible fixing member and the target bracket are both disposed in the accommodating cavity, and the flexible fixing member is located between the housing and the target bracket and is connected to at least one of the housing and the target bracket, so that a probability of unevenness of the decoration can be reduced, and the appearance of the electronic device can be improved.

In some implementations, the decoration further includes a first fixing member 3, the first fixing member 3 is disposed on a side of the flexible fixing member 2 away from the decorative ring 1, the first fixing member 3 is connected to the flexible fixing member 2, and the flexible fixing member 2 and the first fixing member 3 are not coplanar.

The target bracket 6 is a mainboard bracket.

The electronic device further includes a first sealing member 7.

The flexible fixing member 2 is connected to each of the housing 5 and the mainboard bracket.

The first fixing member 3 is disposed in the accommodating cavity and between the housing 5 and the mainboard bracket and is connected to the mainboard bracket, and the first sealing member 7 is disposed in a second gap between the first fixing member 3 and the housing 5.

In the embodiments of this application, the flexible fixing member 2 may be connected to the housing 5 through a first adhesive layer 8. Here, the first adhesive layer 8 may be attached to each of the housing 5 and the flexible fixing member 2, and the first adhesive layer 8 may be a self-adhesive, a double-sided adhesive, or a foam adhesive. The connection between the flexible fixing member 2 and the mainboard bracket may mean that the mainboard bracket presses against the flexible fixing member 2.

The first fixing member 3 may be connected to the mainboard bracket through a second adhesive layer 9. Here, the second adhesive layer 9 may be attached to each of the mainboard bracket and the first fixing member 3, and the second adhesive layer 9 may be a self-adhesive, a double-sided adhesive, or a foam adhesive.

The decoration further includes the first fixing member, the first fixing member is disposed on a side of the flexible fixing member away from the decorative ring, the first fixing member is connected to the flexible fixing member, and the flexible fixing member and the first fixing member are not coplanar. The target bracket is the mainboard bracket.

The electronic device further includes the first sealing member. The flexible fixing member is connected to each of the housing and the mainboard bracket. The first fixing member is disposed in the accommodating cavity and between the housing and the mainboard bracket and is connected to the mainboard bracket, and the first sealing member is disposed in the second gap between the first fixing member and the housing. In this way, the decoration can be more firmly mounted in the electronic device, and the sealing performance of the electronic device can be further improved.

In some implementations, the decoration further includes a first fixing member 3, the first fixing member 3 is disposed on a side of the flexible fixing member 2 away from the decorative ring, the first fixing member 3 is connected to the flexible fixing member 2, and the flexible fixing member 2 and the first fixing member 3 are not coplanar.

The target bracket 6 is a camera bracket having a support member 10 disposed thereon.

The electronic device further includes a second sealing member 11.

The flexible fixing member 2 is connected to each of the housing 5 and the support member 10.

The first fixing member 3 is disposed in the accommodating cavity and between the housing 5 and the camera bracket and is connected to the camera bracket, and the second sealing member 11 is disposed in a third gap between the flexible fixing member 3, the first fixing member 3, and the camera bracket and is disposed adjacent to the support member 10.

In the embodiments of this application, the flexible fixing member 2 may be connected to the housing 5 through the fourth adhesive layer 12. Here, the fourth adhesive layer 12 may be attached to each of the housing 5 and the flexible fixing member 2, and the fourth adhesive layer 12 may be a self-adhesive, a double-sided adhesive, or a foam adhesive. The connection between the flexible fixing member 2 and the support member 10 may mean that the support member 10 presses against the flexible fixing member 2.

The first fixing member 3 may be connected to the camera bracket through a third adhesive layer 13. Here, the third adhesive layer 13 may be attached to each of the camera bracket and the first fixing member 3, and the third adhesive layer 13 may be a self-adhesive, a double-sided adhesive, or a foam adhesive.

The support member 10 may be connected to the camera bracket by welding, screw connection, snap connection, or other means. There may be one or more support members 10.

The decoration further includes the first fixing member, where the first fixing member is disposed on a side of the flexible fixing member away from the decorative ring, the first fixing member is connected to the flexible fixing member, and the flexible fixing member and the first fixing member are not coplanar. The target bracket is the camera bracket having the support member disposed thereon. The electronic device further includes the second sealing member. The flexible fixing member is connected to each of the housing and the support member. The first fixing member is disposed in the accommodating cavity and between the housing and the camera bracket and is connected to the camera bracket, the third gap is present between the flexible fixing member, the first fixing member, and the camera bracket, and the second sealing member is disposed in the third gap and adjacent to the support member. In this way, the decoration can be more firmly mounted in the electronic device, and the sealing performance of the electronic device can be further improved.

It should be noted that, in this specification, the terms "include," "comprise," or any of their variants are intended to cover a non-exclusive inclusion, so that a process, method, article, or apparatus that includes a series of elements not only includes those elements but also includes other elements that are not expressly listed, or further includes elements inherent to such process, method, article, or apparatus. In the absence of more restrictions, an element defined by "including a . . . " does not exclude other same elements in a process, method, article, or apparatus that includes the element.

The embodiments of this application are described above with reference to the accompanying drawings, but this application is not limited to the foregoing specific implementations. The foregoing specific implementations are merely illustrative rather than restrictive. Under the enlightenment of this application, persons of ordinary skill in the art may figure out many forms that are not departing from the essence of this application and the scope of protection of the claims. All such forms fall within the protection of this application.

What is claimed is:

1. A decoration, comprising:
    a decorative ring;
    a flexible fixing member, wherein the flexible fixing member is disposed on an outer surface of the decorative ring, the flexible fixing member extends away from the decorative ring along a radial direction of the decorative ring, and the flexible fixing member is fixedly connected to the decorative ring; and
    a first fixing member disposed on a side of the flexible fixing member away from the decorative ring and connected to the flexible fixing member,
    wherein the first fixing member is further connected to the outer surface of the decorative ring.

2. The decoration according to claim 1,
    wherein the flexible fixing member is a flexible fixing ring, wherein the flexible fixing ring encircles the decorative ring.

3. The decoration according to claim 1, wherein the flexible fixing member is a non-annular flexible fixing member.

4. The decoration according to claim 3, wherein the first fixing member is a rigid fixing ring that encircles the decorative ring, a first gap is present between the rigid fixing ring and the decorative ring, and the flexible fixing member is disposed in the first gap.

5. The decoration according to claim 1, wherein the flexible fixing member and the first fixing member are not coplanar.

6. The decoration according to claim 1, wherein a limiting structure is provided at a joint between the flexible fixing member and the decorative ring.

7. An electronic device, comprising:
    a decoration, comprising:
        a decorative ring;
        a flexible fixing member, wherein the flexible fixing member is disposed on an outer surface of the decorative ring, the flexible fixing member extends away from the decorative ring along a radial direction of the decorative ring, and the flexible fixing member is fixedly connected to the decorative ring; and
        a first fixing member disposed on a side of the flexible fixing member away from the decorative ring and connected to the flexible fixing member, wherein the first fixing member is further connected to the outer surface of the decorative ring;
    a housing; and
    a target bracket, wherein the housing is provided with a through hole and an accommodating cavity that are in communication with each other, the decorative ring is partly disposed inside the through hole and partly disposed in the accommodating cavity, the flexible fixing member and the target bracket are both disposed in the accommodating cavity, and the flexible fixing member is located between the housing and the target bracket and is connected to at least one of the housing or the target bracket.

8. The electronic device according to claim 7, wherein the flexible fixing member and the first fixing member are not coplanar;
    the target bracket is a mainboard bracket;
    the electronic device further comprises a first sealing member;

the flexible fixing member is connected to each of the housing and the mainboard bracket; and the first fixing member is disposed in the accommodating cavity and between the housing and the mainboard bracket and is connected to the mainboard bracket, and the first sealing member is disposed in a second gap between the first fixing member and the housing.

9. The electronic device according to claim 7, wherein the flexible fixing member and the first fixing member are not coplanar;

the target bracket is a camera bracket having a support member disposed thereon;

the electronic device further comprises a second sealing member;

the flexible fixing member is connected to each of the housing and the support member; and the first fixing member is disposed in the accommodating cavity and between the housing and the camera bracket and is connected to the camera bracket, a third gap is present between the flexible fixing member, the first fixing member, and the camera bracket, and the second sealing member is disposed in the third gap and adjacent to the support member.

* * * * *